(12) United States Patent
Apfelbaum et al.

(10) Patent No.: US 10,402,341 B2
(45) Date of Patent: Sep. 3, 2019

(54) KERNEL-ASSISTED INTER-PROCESS DATA TRANSFER

(71) Applicant: Red Hat Israel, Ltd., Raanana (IL)

(72) Inventors: Marcel Apfelbaum, Raanana (IL); Gal Hammer, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 91 days.

(21) Appl. No.: 15/591,469

(22) Filed: May 10, 2017

(65) Prior Publication Data

US 2018/0329828 A1 Nov. 15, 2018

(51) Int. Cl.
*G06F 12/1009* (2016.01)

(52) U.S. Cl.
CPC .. *G06F 12/1009* (2013.01); *G06F 2212/1016* (2013.01); *G06F 2212/65* (2013.01); *G06F 2212/68* (2013.01)

(58) Field of Classification Search
CPC .................................................. G06F 12/1009
USPC ........................................................ 711/206
See application file for complete search history.

(56) References Cited

U.S. PATENT DOCUMENTS

| 9,213,570 | B2 | 12/2015 | Nelson |
| 9,253,309 | B2 | 2/2016 | Fainkichen et al. |
| 9,350,632 | B2 | 5/2016 | Skerry et al. |
| 9,467,398 | B2 | 10/2016 | Miller et al. |
| 9,552,216 | B2 | 1/2017 | Zheng et al. |
| 2013/0219138 | A1* | 8/2013 | Nasu ..................... G06F 3/0608 711/162 |
| 2016/0232019 | A1 | 8/2016 | Shah et al. |
| 2016/0266938 | A1* | 9/2016 | Suzuki ................... G06F 9/5083 |
| 2017/0005923 | A1 | 1/2017 | Babakian |
| 2018/0113732 | A1* | 4/2018 | Garg .................... G06F 13/1673 |
| 2018/0198840 | A1* | 7/2018 | Chandran ............. G06F 3/0611 |
| 2018/0225237 | A1* | 8/2018 | Edirisooriya ........... G06F 13/28 |

OTHER PUBLICATIONS

Garzarella, Stefano et al., "Virtual device passthrough for high speed VM networking," ACM/IEEE Symposium on Architectures for Networking and Communications Systems (ANCS), May 7-8, 2015, Oakland, CA, USA, IEEE, 12 pages.

(Continued)

*Primary Examiner* — Gautam Sain
(74) *Attorney, Agent, or Firm* — Withrow & Terranova, PLLC (57) ABSTRACT

Inter-process data transfer on a host computing device is disclosed. A kernel module executing on the host computing device receives, from a first process, buffer registration information that identifies a virtual address of a receive buffer and a length of the receive buffer. The kernel module determines a first physical memory address that corresponds to the virtual address of the receive buffer. The kernel module receives, from a second process, a send request to send data to the first process, the send request including a virtual address of a send buffer, a length of the data, and a destination identifier that is associated with the receive buffer. The kernel module determines a second physical memory address that corresponds to the virtual address of the send buffer and transfers the data directly from the second physical memory address to the first physical memory address.

17 Claims, 6 Drawing Sheets

(56) References Cited

OTHER PUBLICATIONS

Ren, Yi et al., "Shared-Memory Optimizations for Inter-Virtual-Machine Communication," ACM Computing Surveys, vol. 48, Issue 4, Article 49, Feb. 2016, ACM, pp. 1-42.
Siemon, Dan, "Queueing in the Linux Network Stack," LINUX Journal, Bufferbloat, Sep. 23, 2013, http://www.linuxjournal.com/content/queueing-linux-network-stack, Linux Journal, 10 pages.
Singh, Sahil, "Analysis of inter-VM networking for co-located VMs on ARM platform," Seminar Report, Roll No. 143050001, Oct. 2015, Mumbai, India, Indian Institute of Technology Bombay, 34 pages.
Witchel, Emmett, "Virtual Memory and Address Translation," Lecture Presentation in CS 372 Operating Systems, University of Texas at Austin, Date Unknown, http://www.cs.utexas.edu/users/witchel/372/lectures/15. VirtualMemory.pdf, 15 pages.

\* cited by examiner

KERNEL-ASSISTED INTER-PROCESS DATA TRANSFER

TECHNICAL FIELD

The examples relate generally to data transfer between processes executing on the same host, and in particular to kernel-assisted inter-process data transfer.

BACKGROUND

It is often desirable to transfer data between two processes executing on the same host computing device. In certain environments, such as a pipeline of processes that each operate on incoming data as the incoming data progresses through the pipeline, the incoming data is transferred between multiple processes on the same host computing device resulting in a successive sequence of inter-process data transfers.

SUMMARY

The examples implement kernel-assisted inter-process data transfer that eliminates the need for shared memory, eliminates a need to make an intermediate copy of data, and eliminates network subsystem processing overhead. Among other advantages, the disclosed examples increase throughput and processing for inter-process data transfer in a secure manner.

In one example a method for inter-process data transfer on a host computing device is provided. The method includes receiving, by a kernel module executing on the host computing device, from a first process, buffer registration information that identifies a virtual address of a receive buffer and a length of the receive buffer. The method further includes determining, by the kernel module, a first physical memory address that corresponds to the virtual address of the receive buffer. The method further includes receiving, by the kernel module from a second process, a send request to send data to the first process, the send request including a virtual address of a send buffer, a length of the data, and a destination identifier that is associated with the receive buffer. The method further includes determining, by the kernel module, a second physical memory address that corresponds to the virtual address of the send buffer, and transferring, by the kernel module, the data directly from the second physical memory address to the first physical memory address.

In another example a host computing device is provided. The host computing device includes a memory and a processor device coupled to the memory. The processor device is to receive, by a kernel module, from a first process, buffer registration information that identifies a virtual address of a receive buffer and a length of the receive buffer. The processor device is further to determine, by the kernel module, a first physical memory address that corresponds to the virtual address of the receive buffer. The processor device is further to receive, by the kernel module from a second process, a send request to send data to the first process, the send request including a virtual address of a send buffer, a length of data, and a destination identifier that is associated with the receive buffer. The processor device is further to determine, by the kernel module, a second physical memory address that corresponds to the virtual address of the send buffer, and transfer, by the kernel module, the data directly from the second physical memory address to the first physical memory address.

In another example a computer program product stored on a non-transitory computer-readable storage medium is provided. The computer program product includes instructions to cause a processor device to receive, by a kernel module, from a first process, buffer registration information that identifies a virtual address of a receive buffer and a length of the receive buffer. The instructions further cause the processor device to determine, by the kernel module, a first physical memory address that corresponds to the virtual address of the receive buffer. The instructions further cause the processor device to receive, by the kernel module from a second process, a send request to send data to the first process, the send request including a virtual address of a send buffer, a length of the data, and a destination identifier that is associated with the receive buffer. The instructions further cause the processor device to determine, by the kernel module, a second physical memory address that corresponds to the virtual address of the send buffer, and transfer, by the kernel module, the data directly from the second physical memory address to the first physical memory address.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

It is often desirable to transfer data between two processes executing on the same host computing device. In certain environments, such as a pipeline of processes that each operate on incoming data as the incoming data progresses through the pipeline, the incoming data is transferred between multiple processes on the same host computing device.

However, conventional inter-process communication techniques incur substantial processing overhead, and may require that an intermediate copy of data be made. Some mechanisms for transferring data between processes, such as shared memory, requires that each process have its own shared memory, which causes scalability problems as well as security problems. In a virtual machine context, processes can share data through networking subsystems. However, this requires that multiple copies of the data be made, and incurs the relatively substantial processing overhead of multiple networking subsystems.

The examples implement kernel-assisted inter-process data transfer that eliminates the need for shared memory, eliminates a need to make an intermediate copy of data, and eliminates network subsystem processing overhead. Among other advantages, the disclosed examples increase throughput and processing for inter-process data transfer in a secure manner.

In particular, in one example, a first process sends information relating to a receive buffer to a kernel module. The information identifies a virtual address of the receive buffer and a length of the receive buffer. The kernel module receives the virtual address of the receive buffer and determines a physical memory address that corresponds to the virtual address. The kernel module may store this physical memory address in a table for later use. A second process then sends to the kernel module a send request to send data to the first process. The send request includes a virtual address of a send buffer in which the data to be sent resides, a length of the data, and a destination identifier associated with the receive buffer of the first process. The kernel module determines a physical memory address that corresponds to the virtual address of the send buffer. The kernel module accesses the table to obtain the physical memory address of the receive buffer of the first process, and using the physical memory address of the send buffer and the physical memory address of the receive buffer, transfers the data from the send buffer to the receive buffer without making an intermediate copy of the data.

Figure 1:
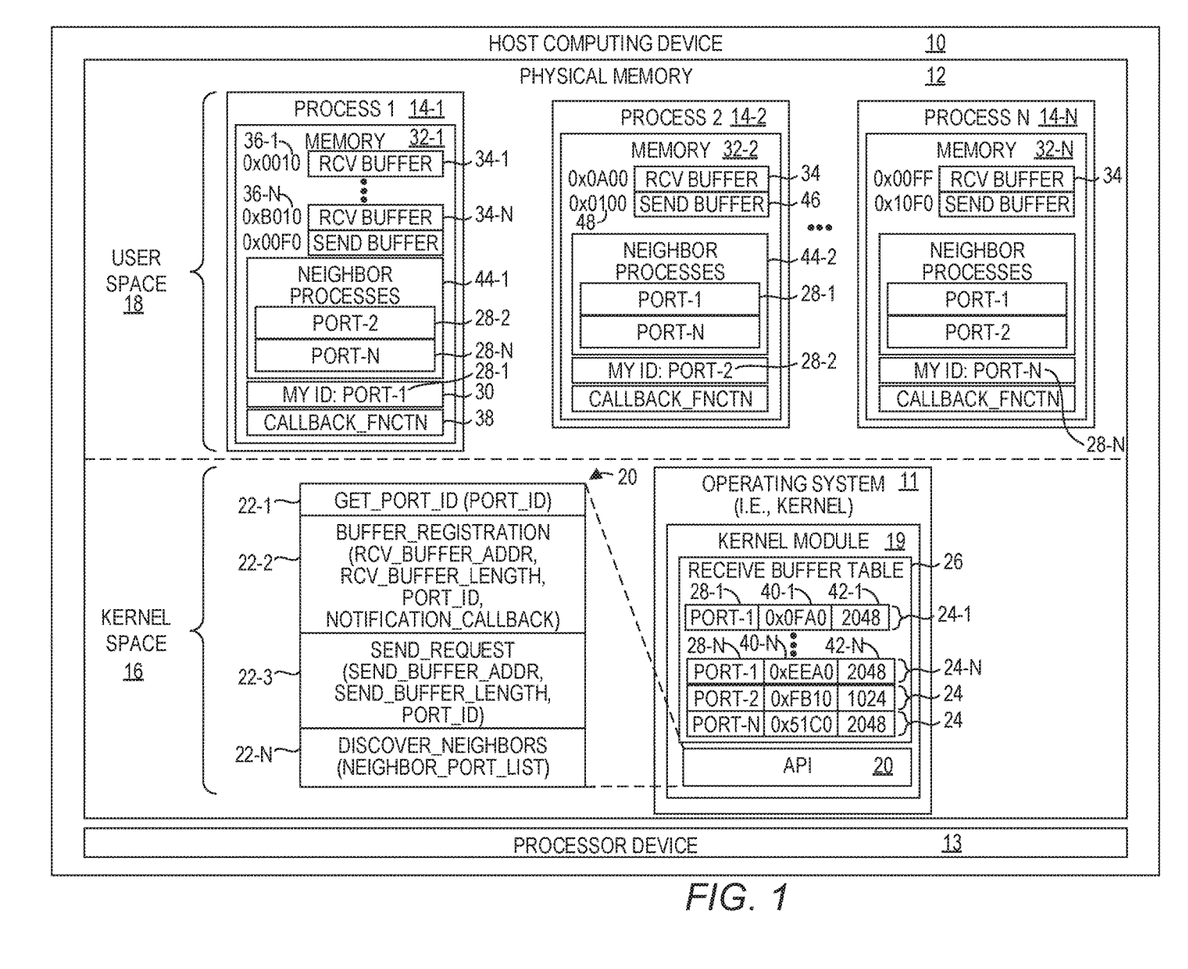
FIG. 1 is a block diagram of a host computing device according to one example.

FIG. 1 is a block diagram of a host computing device 10 according to one example. The host computing device 10 includes an operating system (OS) 11, sometimes referred to as a kernel. The OS 11 may comprise, for example, a Linux operating system, a Unix operating system, a Windows operating system, or any other operating system. The OS 11, among other responsibilities, controls and coordinates access to physical components of the host computing device 10, such as a physical memory 12, a processor device 13, network card(s) (not illustrated), storage device(s) (not illustrated), and the like, by one or more processes 14-1-14-N (generally, processes 14). The OS 11 operates in a privileged kernel space 16 and can access the physical memory 12 via physical memory addresses directly. The phrase "physical memory address" or "physical address" as used herein refers to the identifiers used by an operating system, such as the OS 11, to directly access memory. The OS 11 initiates the processes 14 in a user space 18. The memory addresses utilized by the processes 14 are virtual addresses that are mapped, by the OS 11, to physical memory addresses of the physical memory 12. Thus, each attempt to access a virtual address by a process 14 is processed by the OS 11. The virtual address is converted to a physical memory address by the OS 11, and the physical memory 12 at the physical memory address is then accessed. The phrase "virtual address" as used herein refers to addresses that an operating system, such as the OS 11, maps or otherwise translates to a physical memory address. The kernel space 16 and the user space 18 may be implemented, at least in part, via different modes of the processor device 13. For example, the processor device 13 may be put into a ring 0 mode when running the OS 11, which allows the OS 11 to have certain privileges, such as the ability to directly access the physical memory 12. The processor device 13 may be put into a ring 3 mode when running the processes 14, which limits certain functionality, such as directly accessing the physical memory 12. An attempt by a process 14 to implement a function that is inappropriate for the ring 3 mode may result in a fault.

In accordance with one example, to facilitate data transfer between the processes 14, the OS 11 includes a kernel module 19. The kernel module 19 also runs in the kernel space 16. The kernel module 19 may be but one of many kernel modules of the OS 11. The kernel module 19 offers an application programming interface (API) 20 that can be invoked by the processes 14. In particular, the API 20 includes a number of functions 22-1-22-N (generally, functions 22) that may be invoked by the processes 14. The function 22-1, entitled GET_PORT_ID, when invoked by a process 14, returns a unique destination identifier (PORT_ID) that is associated with receive buffers of the respective process 14, and which may be used, as discussed in greater detail below, to identify where data is to be transferred.

The function 22-2, entitled BUFFER_REGISTRATION, allows a process 14 to provide to the kernel module 19 a virtual address of a receive buffer associated with the respective process 14 (REC_BUFFER_ADDR), a length of the receive buffer (REC_BUFFER_LENGTH), the destination identifier associated with the receive buffer (PORT_ID), and a callback function (NOTIFICATION_CALLBACK) that can be invoked by the kernel module 19 to inform the respective process 14 that data has been transferred to the receive buffer.

The function 22-3, entitled SEND_REQUEST, allows a process 14 that has data to send to another process 14 to provide to the kernel module 19 a virtual address of a send buffer (SEND_BUFFER_ADDR), a length of the data to be transferred (SEND_BUFFER_LENGTH), and a destination identifier that identifies the destination of the data transfer (PORT_ID). The function 22-N, entitled DISCOVER_NEIGHBORS, when invoked by a process 14 returns a list of identifiers (NEIGHBOR_PORT_LIST) of other processes 14 on the host computing device 10 to which data may be transferred.

As an example, assume that during an initialize phase of the process 14-1, the process 14-1 invokes the function 22-1. The kernel module 19 generates an entry 24-1 in a data structure, in this example a receive buffer table 26. The kernel module 19 generates a destination identifier (ID) 28-1 (PORT-1), and provides the destination ID 28-1 to the process 14-1. The kernel module 19 also inserts the destination ID 28-1 into the entry 24-1. The process 14-1 stores the destination ID 28-1 in an ID field 30 for subsequent receive buffer registration.

The process 14-1 has access to a memory 32-1. The memory 32-1 may be referred to as virtual memory because access to any portion of the memory 32-1 is via a virtual address which is translated by the kernel module 19 to a physical memory address that corresponds to the physical memory 12. The process 14-1 generates a plurality of receive buffers 34-1-34-N (generally, receive buffers 34) in the memory 32-1. Each receive buffer 34 is located at a corresponding virtual address 36-1-36-N (generally, virtual addresses 36) by which the process 14-1 accesses the receive buffers 34 in the memory 32-1. The process 14-1 then invokes the function 22-2 and provides to the kernel module 19 the list of virtual addresses 36-1-36-N, a list of lengths that correspond to the virtual addresses 36-1-36-N, the destination ID 28-1 (PORT-1) that is to be associated with the receive buffers 34, and a callback function 38 that the kernel module 19 may invoke when the kernel module 19 has transferred data to a receive buffer 34 of the process 14-1.

For each virtual address 36 in the list of virtual addresses 36-1-36-N, the kernel module 19 determines a physical memory address of the physical memory 12 that corresponds to the respective virtual address 36, generates an entry 24 in the receive buffer table 26, and stores the physical memory address, the length of the receive buffer pointed to by the physical memory address, and the destination ID 28-1 (PORT-1). The kernel module 19 may also "pin" the underlying physical memory to ensure that the page containing the physical memory address is not swapped out to disk. As an example, the entry 24-1 corresponds to the receive buffer 34-1. The entry 24-1 contains a physical memory address 40-1 (0x0FA0) that corresponds to the virtual address 36-1 (0x0010). The entry 24-1 also includes the destination ID 28-1 (PORT-1), and a length 42-1 provided by the process 14-1 that identifies a length of the receive buffer 34-1. The entry 24-N corresponds to the receive buffer 34-N. The entry 24-N contains a physical memory address 40-N (0xEEA0) that corresponds to the virtual address 36-N (0xB010). The entry 24-N also includes the destination ID 28-N (PORT-1), and a length 42-N provided by the process 14-1 that identifies the length of the receive buffer 34-N. While only two receive buffers 34 are illustrated, a process 14 may have any number of receive buffers 34. The receive buffer table 26 includes other entries 24 associated with receive buffers 34 in the processes 14-2-14-N, which may have been generated in accordance with similar processing undertaken by such processes 14-2-14-N.

The process 14-1 may also invoke the function 22-N to obtain a list of destination IDs 28-2-28-N of the other processes 14-2-14-N, and store such destination IDs 28-2-28-N in a neighbor processes structure 44-1. The process 14-1 may later utilize a destination ID 28 to transfer data to a receive buffer 34 associated with the particular destination ID 28. It will be appreciated that the function 22-N is only one example of a mechanism for determining the destination IDs 28 of the other processes 14, and that any other discovery mechanism may be used by the processes 14 to discover the destination IDs 28 of the other processes 14.

Assume, for the sake of illustration, that the processes 14-2-14-N have undergone similar processing as described above with regard to the process 14-1. Further assume that the process 14-2 desires to transfer data to the process 14-1. The process 14-2 accesses a neighbor process structure 44-2 and obtains the destination ID 28-1. The data to be transferred to the process 14-1 exists in a send buffer 46 that is accessed by the process 14-2 via a virtual address 48. The process 14-2 generates a send request by invoking the function 22-3 and providing, as parameters, the virtual address 48 (0x0100) of the send buffer 46, a length of the data in the send buffer 46, and the destination ID 28-1 (PORT-1) that is associated with the receive buffers 34-1-34-N of the process 14-1.

The kernel module 19 receives the send request, and determines a physical memory address that corresponds to the virtual address 48 of the send buffer 46. The kernel module 19 accesses the receive buffer table 26 and determines that the entries 24-1-24-N correspond to the receive buffers 34-1-34-N of the process 14-1 based on the destination ID 28-1. The kernel module 19 analyzes the length of the data in the send buffer 46 provided by the process 14-2 and the lengths 42-1-42-N in the entries 24. The kernel module 19 then transfers the data in the send buffer 46 to as many of the receive buffers 34-1-34-N as required to hold the data in the send buffer 46 using the physical memory address of the send buffer 46 and the physical memory addresses of the receive buffers 34-1-34-N. As an example, if the length of the data in the send buffer 46 were 4000 bytes, the kernel module 19 may transfer 2048 bytes from the send buffer 46 to the receive buffer 34-1, and transfer the remaining 1952 bytes from the send buffer 46 to the receive buffer 34-N. Because the kernel module 19 copies the data directly from the send buffer 46 to the receive buffers 34, no intermediate copies are made.

The kernel module 19 may then invoke the callback function 38 to notify the process 14-1 that data has been transferred to the receive buffers 34. The callback function 38 may include parameters that identify the particular receive buffers 34 to which the data from the send buffer 46 was transferred, and the lengths of the data in such receive buffers 34.

Figure 2:
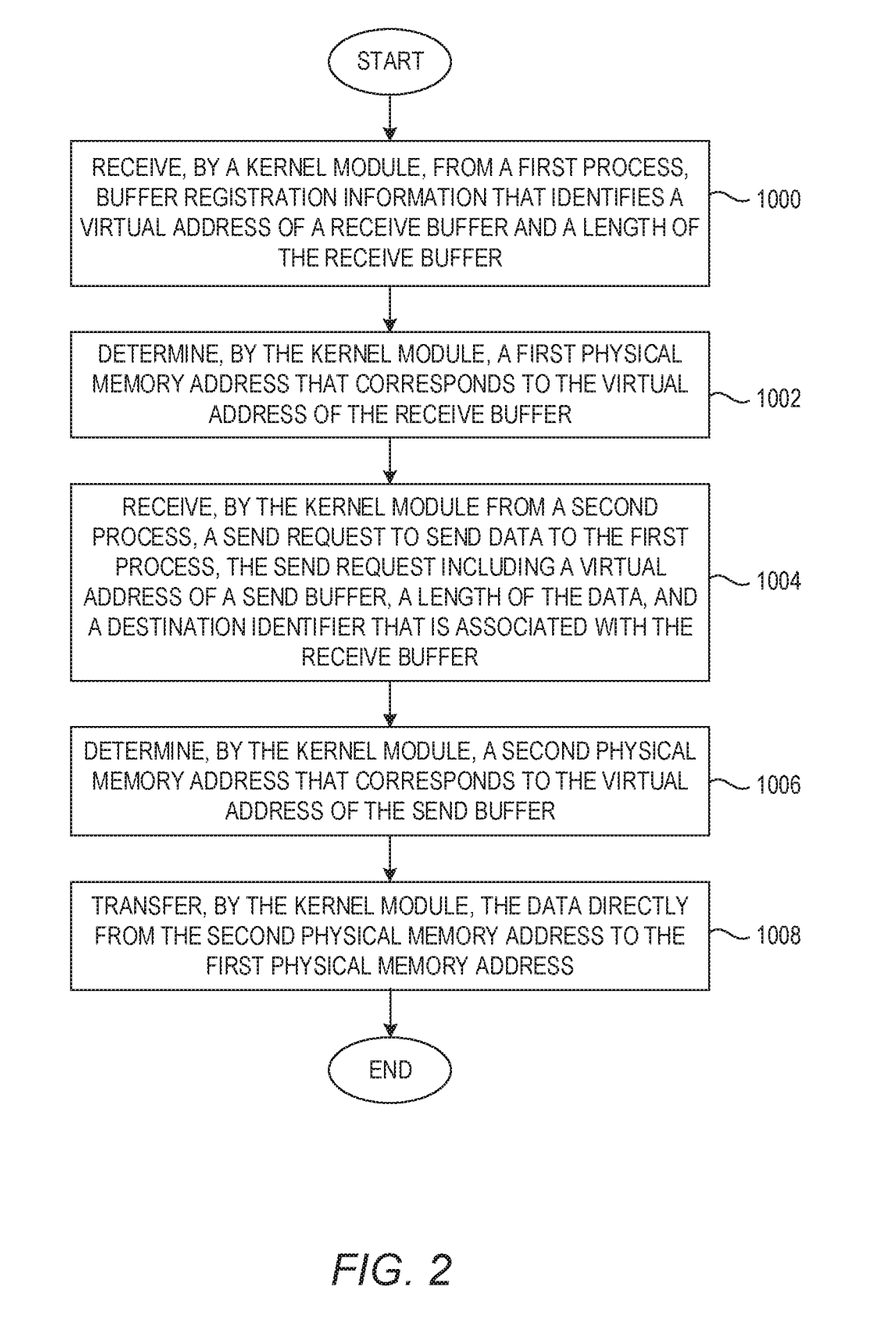
FIG. 2 is a flowchart of a method for kernel-assisted inter-process data transfer according to one example.

FIG. 2 is a flowchart of a method for kernel-assisted inter-process data transfer according to one example. FIG. 2 will be discussed in conjunction with FIG. 1. The kernel module 19 receives from the process 14-1, buffer registration information that identifies the virtual addresses 36-1-36-N of the receive buffers 34-1-34-N, and lengths of the receive buffers 34-1-34-N (FIG. 2, block 1000). The kernel module 19 determines physical memory addresses 40-1-40-N that correspond to the virtual addresses 36-1-36-N of the receive buffers 34-1-34-N (FIG. 2, block 1002). The kernel module 19 receives from the process 14-2 a send request to send data to the process 14-1. The send request includes the virtual address 48 of the send buffer 46, a length of the data, and the destination ID 28-1 that is associated with the receive buffers 34-1-34-N (FIG. 2, block 1004). The kernel module 19 determines a physical memory address that corresponds to the virtual address 48 of the send buffer 46, and transfers the data directly from the physical memory address to the physical memory address 40-1 (FIG. 2, blocks 1006-1008).

Figure 3:
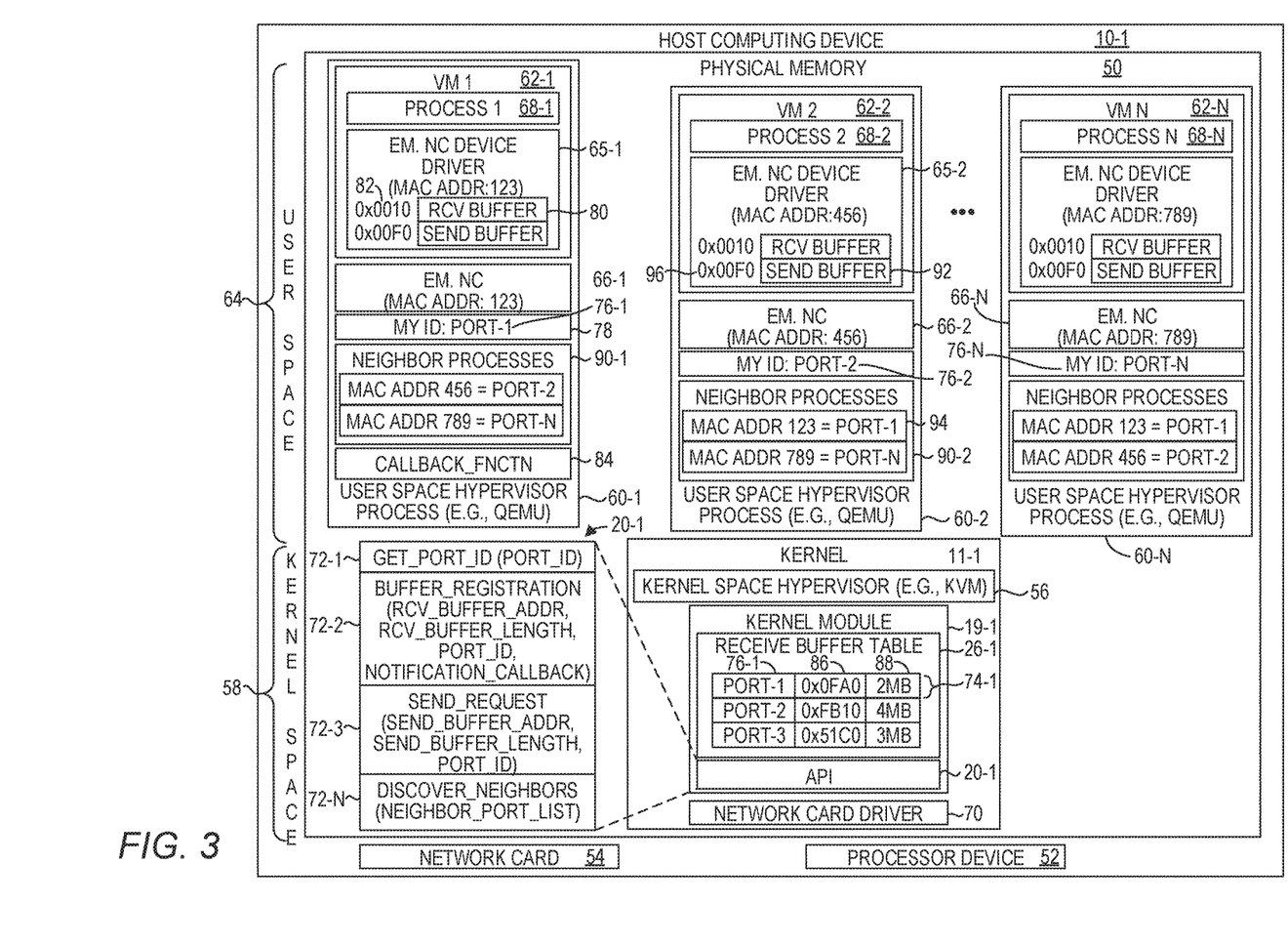
FIG. 3 is a block diagram of a host computing device according to another example.

FIG. 3 is a block diagram of a host computing device 10-1 according to another example. The host computing device 10-1 includes a physical memory 50, a processor device 52, and a network card 54. In this example, the host computing device 10-1 hosts a virtualization environment that includes a kernel 11-1 and a kernel space hypervisor 56 (hereinafter "hypervisor 56" for the sake of brevity) that executes in a kernel space 58. The kernel space hypervisor 56 may comprise any suitable hypervisor, such as a VMware® hypervisor, a Microsoft® hypervisor, a Red Hat® hypervisor, a Kernel-based Virtual Machine (KVM)-based hypervisor, or the like.

One or more user space hypervisor processes 60-1-60-N (hereinafter "hypervisor processes" for the sake of brevity) each implement a virtual machine 62-1-62-N (generally, virtual machines 62) on the host computing device 10-1. The hypervisor processes 60-1-60-N (generally, hypervisor processes 60) execute in a user space 64. The hypervisor processes 60, in one example, comprise a quick emulator (QEMU) hypervisor, available from www.qemu-project.org, but the examples are not limited to the QEMU hypervisor. The kernel space 58 and the user space 64 are substantially similar to the kernel space 16 and the user space 18 as discussed above with regard to FIG. 1, except as otherwise discussed herein.

As discussed above with regard to the OS 11 in FIG. 1, the kernel space hypervisor 56 controls and coordinates access to physical components of the host computing device 10-1, such as the physical memory 50, the processor device 52, the network card 54, storage device(s) (not illustrated), and the like, by the one or more hypervisor processes 60 and other user processes that may be executing in the user space 64. The kernel space hypervisor 56 operates in the privileged kernel space 58 and can access the physical memory 50 via physical memory addresses directly.

The hypervisor processes 60 each isolate the respective virtual machines 62 from one another. Each virtual machine 62 comprises a guest operating system, such as a Windows OS, a Linux OS, a Unix OS, or any other suitable OS. Each virtual machine 62 may have no knowledge of the other virtual machines 62. The hypervisor process 60-1, among other responsibilities, emulates hardware for the virtual machine 62-1. In this example, the hypervisor process 60-1 provides the virtual machine 62-1 with an emulated network card 66-1 to facilitate network communications between the virtual machine 62-1 and the other virtual machines 62, and between the virtual machine 62-1 and other processing entities that are external to the host computing device 10-1. The emulated network card 66-1 has a corresponding unique media access control (MAC) address (123) that uniquely identifies the emulated network card 66-1 and which can be used as a destination address by other computing entities to send data to the emulated network card 66-1.

The virtual machine 62-1 includes a network card device driver 65-1. When a process 68-1 that executes in the virtual machine 62-1 writes to the emulated network card 66-1, the network card device driver 65-1 is invoked, which in turn invokes the emulated network card 66-1 of the hypervisor process 60-1. To the process 68-1 and the virtual machine 62-1, the emulated network card 66-1 appears to be a physical network card that is coupled to a network.

Typically, in the absence of the examples disclosed herein, the emulated network card 66-1 interacts with a native network card driver 70 to properly route the data from the process 68-1 to the desired recipient. This involves relatively substantial network stack processing of the data, making at least one copy of the data, and, if the data is destined for a process 68-2 or 68-N executing on the same host computing device 10-1, reverse network stack processing of the data by a respective emulated network card 66-2 or 66-N. If this process is repeated often, as it might be where the processes 68-1-68-N operate in a pipeline and process data streams as they arrive at the host computing device 10-1, such that each packet is first processed by the process 68-1, then by the process 68-2, and then by the process 68-N, the network stack processing and copying of the data streams can result in a substantial amount of processing and memory resource allocation, negatively impacting throughput of the pipeline. The examples herein provide a mechanism for transferring data between the processes 68 in a manner that avoids the normal network subsystem processing and a need to make multiple copies of the data, substantially reducing the overhead otherwise required to transfer data between the processes 68 in separate virtual machines 62.

The kernel 11-1 includes a kernel module 19-1 that operates substantially similarly to the kernel module 19 discussed above with regard to FIG. 1, except as otherwise discussed herein. The kernel module 19-1 offers an API 20-1 that can be invoked by the hypervisor processes 60. The API 20-1 includes a number of functions 72-1-72-N. The function 72-1, entitled GET_PORT_ID, when invoked by a hypervisor process 60, returns a unique destination identifier (PORT_ID) that is associated with receive buffers of an emulated network card 66, and which may be used, as discussed in greater detail below, to identify where data is to be transferred by the kernel module 19-1.

The function 72-2, entitled BUFFER_REGISTRATION, allows a hypervisor process 60 to provide to the kernel module 19-1 a virtual address of a receive buffer associated with an emulated network card 66 (REC_BUFFER_ADDR), a length of the receive buffer (REC_BUFFER_LENGTH), the destination identifier associated with the receive buffer (PORT_ID), and a callback function (NOTIFICATION_CALLBACK) that can be invoked by the kernel module 19-1 to inform the respective hypervisor process 60 that data has been transferred to the receive buffer.

The function 72-3, entitled SEND_REQUEST, allows a hypervisor process 60 that has received data via an emulated network card 66 that is offered by that hypervisor process 60, and which is destined for a receive buffer of another emulated network card 66, to provide to the kernel module 19-1 a virtual address of a send buffer (SEND_BUFFER_ADDR), a length of the data to be transferred (SEND_BUFFER_LENGTH), and a destination identifier that identifies the destination of the data transfer (PORT_ID).

The function 72-N, entitled DISCOVER_NEIGHBORS, when invoked by a hypervisor process 60 returns a list of identifiers (NEIGHBOR_PORT_LIST) that are associated with receive buffers of emulated network cards 66 of other hypervisor processes 60 on the host computing device 10-1 to which data may be transferred.

As an example of the kernel module 19-1 in operation, assume that during an initialize phase of the hypervisor process 60-1, the hypervisor process 60-1 invokes the function 72-1. The kernel module 19-1 generates an entry 74-1 in a data structure, in this example a receive buffer table 26-1. The kernel module 19-1 generates a destination identifier (ID) 76-1 (PORT-1), inserts the destination ID 76-1 into the entry 74-1, and provides the destination ID 76-1 to the hypervisor process 60-1. The hypervisor process 60-1 stores the destination ID 76-1 in an ID field 78 for subsequent receive buffer registration.

Figure 4:
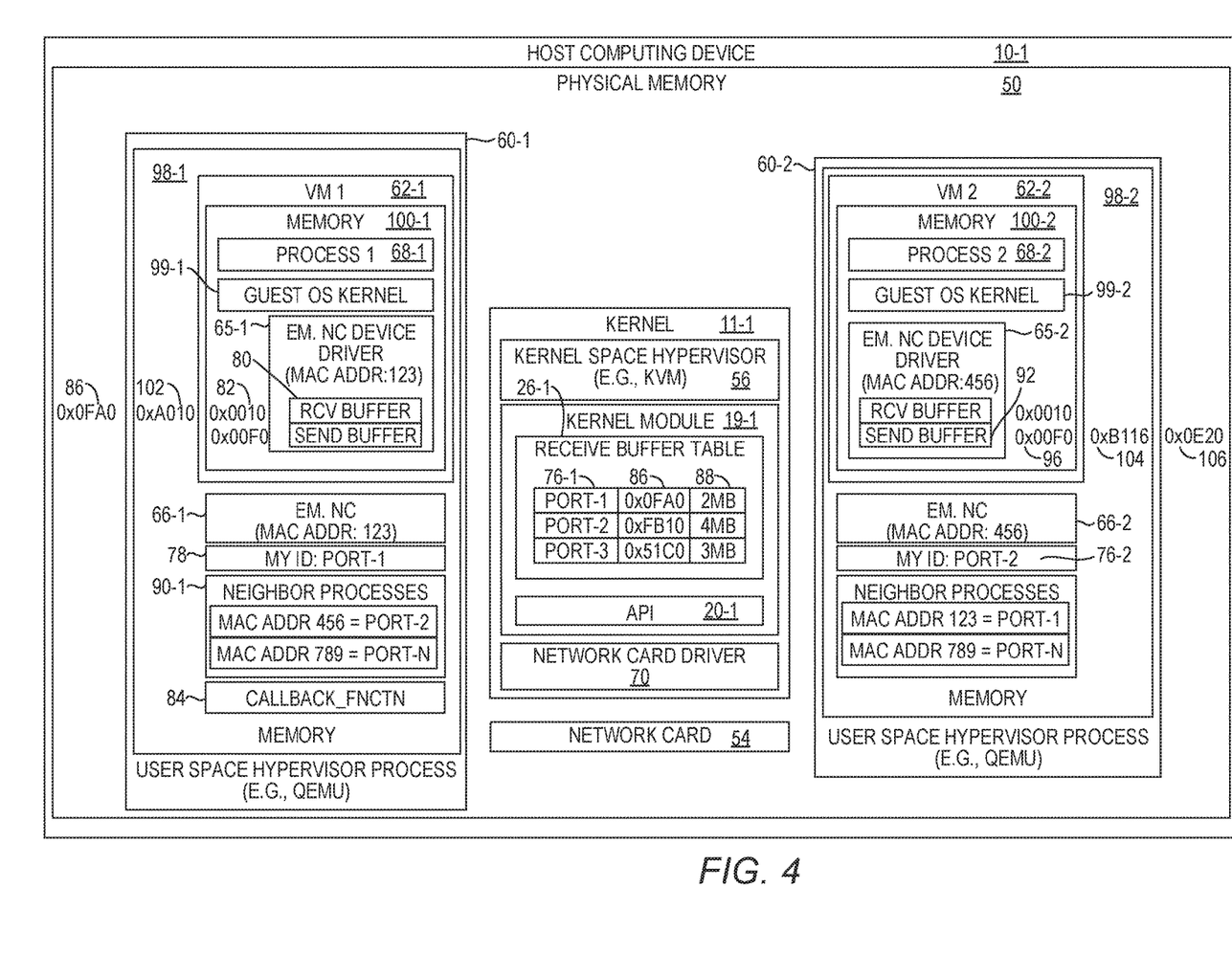
FIG. 4 is a block diagram illustrating certain aspects of the host computing device illustrated in FIG. 3 in greater detail to illustrate the use of virtual addresses according to one example.

When the hypervisor process 60-1 is initiated, the hypervisor process 60-1 is given access to an area of the physical memory 50 that the hypervisor process 60-1 can access through virtual addresses, similar to the manner discussed above with regard to the processes 14. When the hypervisor process 60-1 initiates the virtual machine 62-1, the hypervisor process 60-1 gives the virtual machine 62-1 access to a portion of the memory 50 allocated to the hypervisor process 60-1, but also virtualizes the memory addresses such that the virtual machine 62-1 accesses such memory via virtual addresses which the hypervisor process 60-1 can then map to the virtual addresses of the hypervisor process 60-1. The virtual machine 62-1 perceives such virtual addresses as guest physical addresses and is unaware that the virtual addresses are not physical addresses. FIG. 4 provides additional discussion on this topic.

The emulated network card 66-1 has a plurality of associated emulated network card receive buffers 80 (only one shown for purposes of illustration) (hereinafter "receive buffer 80" for the sake of brevity). The receive buffer 80 may be accessed by a virtual address 82 (0x0010) (also referred to as a guest physical address from the perspective of the virtual machine 62-1) used by the virtual machine 62-1. The hypervisor process 60-1 then translates the virtual address 82 to a virtual address of the hypervisor process 60-1. The hypervisor process 60-1 invokes the function 72-2 to provide buffer registration information to the kernel module 19-1 regarding the receive buffer 80, and provides to the kernel module 19-1 the virtual address of the hypervisor process 60-1 that corresponds to the receive buffer 80, the length of the receive buffer 80, the destination ID 76-1 (PORT-1) that is to be associated with the receive buffer 80, and a callback function 84 that the kernel module 19-1 may invoke when the kernel module 19-1 has transferred data to the receive buffer 80 associated with the emulated network card 66-1.

The kernel module 19-1 determines a physical memory address 86 (0x0FA0) of the physical memory 50 that corresponds to the virtual address provided by the hypervisor process 60-1, inserts the physical memory address 86 in the entry 74-1 in the receive buffer table 26-1, and inserts the length 88 of the receive buffer 80 provided by the hypervisor process 60-1 in the entry 74-1. Again, while for purposes of illustration only a single receive buffer 80 is shown, in practice this process may be repeated by the hypervisor process 60-1 for any number of receive buffers 80.

The hypervisor process 60-1 may also invoke the function 72-3 to obtain a list of destination IDs 76-1-76-N of other receive buffers associated with other emulated network cards 66-2-66-N, and store such destination IDs 76-1-76-N in a neighbor processes structure 90-1. Each destination ID 76 may be stored in conjunction with the MAC address of the emulated network cards 66-2-66-N associated with the corresponding receive buffers. It will be appreciated that the function 72-3 is only one example of a mechanism for determining the destination IDs 76 of receive buffers associated with other emulated network cards 66, and that any other discovery mechanism may be used by the hypervisor processes 60-1 to discover such destination IDs 76.

Assume, for the sake of illustration, that the hypervisor processes 60-2-60-N have undergone similar processing as described above with regard to the hypervisor process 60-1. Further assume that a process 68-2 in the virtual machine 62-2 desires to transfer a message comprising data to the process 68-1 in the virtual machine 62-1. The process 68-2 places the desired data in an emulated network card send buffer 92 (hereinafter "send buffer 92" for the sake of brevity), addresses the data to the emulated network card 66-1 using the MAC address of the emulated network card 66-1 (123), and initiates a transmission request to the emulated network card 66-2 via a network card device driver 65-2. The network card device driver 65-2 invokes the emulated network card 66-2 implemented by the hypervisor process 60-2.

If the hypervisor process 60-2 examined the transmission request and determined that the message was destined for a destination other than the emulated network cards 66-1, 66-N, the hypervisor process 60-2 may invoke the native network card driver 70 for normal network subsystem processing of the message. In this example however, the hypervisor process 60-2 examines the transmission request and determines that the message is destined for the receive buffer 80 by virtue of the message being addressed to the emulated network card 66-1 via the MAC address of the emulated network card 66-1 (123). In particular, the hypervisor process 60-2 accesses a neighbor processes structure 90-2 and, based on an entry 94, determines that the MAC address associated with the transmission request is associated with the destination ID 76-1, which is associated with the receive buffer 80. The send buffer 92 has a virtual address 96 (0x00F0) used by the virtual machine 62-2. The hypervisor process 60-2 translates the virtual address 96 to a virtual address of the hypervisor process 60-2 that corresponds to the virtual address 96. The hypervisor process 60-2, in lieu of communicating the message to the native network card driver 70 for normal network subsystem processing of the message, communicates a send request to the kernel module 19-1 by invoking the function 72-3 and providing, as parameters, the virtual address of the hypervisor process 60-2 that corresponds to the send buffer 92, a length of the data in the send buffer 92, and the destination ID 76-1 (PORT-1) that is associated with the receive buffer 80 of the emulated network card 66-1.

The kernel module 19-1 receives the send request, and determines a physical memory address that corresponds to the virtual address of the send buffer 92 provided by the second hypervisor process 60-2. The kernel module 19-1 accesses the receive buffer table 26-1 and determines that the entry 74-1 correspond to the receive buffer 80 of the emulated network card 66-1 based on the destination ID 76-1. The kernel module 19-1 then transfers the data in the send buffer 92 to the receive buffer 80. The kernel module 19-1 may then invoke the callback function 84 to notify the hypervisor process 60-1 that data has been transferred to the receive buffer 80. The hypervisor process 60-1, via the emulated network card 66-1, may then notify the virtual machine 62-2 that data has arrived in the receive buffer 80. In this manner, no additional copies of the data in the send buffer 92 were required, and network subsystem processing that would otherwise be performed by the native network card driver 70 is avoided.

FIG. 4 is a block diagram illustrating certain aspects of the host computing device 10-1 in greater detail to illustrate the use of virtual addresses in the host computing device 10-1 according to one example. The host computing device 10-1 is identical to the host computing device 10-1 in FIG. 3, but certain additional components are illustrated. When the hypervisor process 60-1 initiates, the hypervisor process 60-1 is provided a memory 98-1. Because the hypervisor process 60-1 is in the user space 64, the hypervisor process 60-1 accesses the memory 98-1 via virtual addresses. When the virtual machine 62-1 is initiated by the hypervisor process 60-1, the hypervisor process 60-1 provides a guest operating kernel 99-1 a memory 100-1 which is managed by the guest operating kernel 99-1. The guest operating kernel 99-1 accesses the memory 100-1 via virtual addresses that differ from the virtual addresses of the hypervisor process 60-1.

When the virtual machine 62-1 provides the virtual address 82 (0x0010) to the hypervisor process 60-1, the hypervisor process 60-1 converts the virtual address 82

(0x0010) to a virtual address 102 (0xA010) that corresponds to the virtual address 82 (0x0010). This conversion/translation may, for example, be via a memory table maintained by the hypervisor process 60-1. When the hypervisor process 60-1 provides the virtual address 102 (0xA010) to the kernel module 19-1 via, for example, the buffer registration function 72-2, the kernel module 19-1 then translates the virtual address 102 (0xA010) to the physical memory address 86 (0x0FA0), and utilizes the physical memory address 86 in any data transfer to the receive buffer 80.

Similarly, when the hypervisor process 60-2 is initiated, the hypervisor process 60-2 is provided a memory 98-2. Because the hypervisor process 60-2 is in the user space 64, the hypervisor process 60-2 accesses the memory 98-2 via virtual addresses. When the virtual machine 62-2 is initiated by the hypervisor process 60-2, the hypervisor process 60-2 provides a guest operating kernel 99-2 a memory 100-2 which is managed by the guest operating kernel 99-2. The guest operating kernel 99-2 accesses the memory 100-2 via virtual addresses that differ from the virtual addresses of the hypervisor process 60-2.

When the virtual machine 62-2 provides the virtual address 96 (0x00F0) of the send buffer 92 to the hypervisor process 60-2 in a transmission request, the hypervisor process 60-2 converts the virtual address 96 (0x00F0) of the send buffer 92 to a virtual address 104 (0xB116) that corresponds to the virtual address 96 (0x00F0). When the hypervisor process 60-2 provides the virtual address 104 (0xB116) to the kernel module 19-1 in, for example, a send request, the kernel module 19-1 then translates the virtual address 104 (0xB116) to a physical memory address 106 (0x0E20), and utilizes the physical memory address 106 in any data transfer from the send buffer 92.

Figure 5:
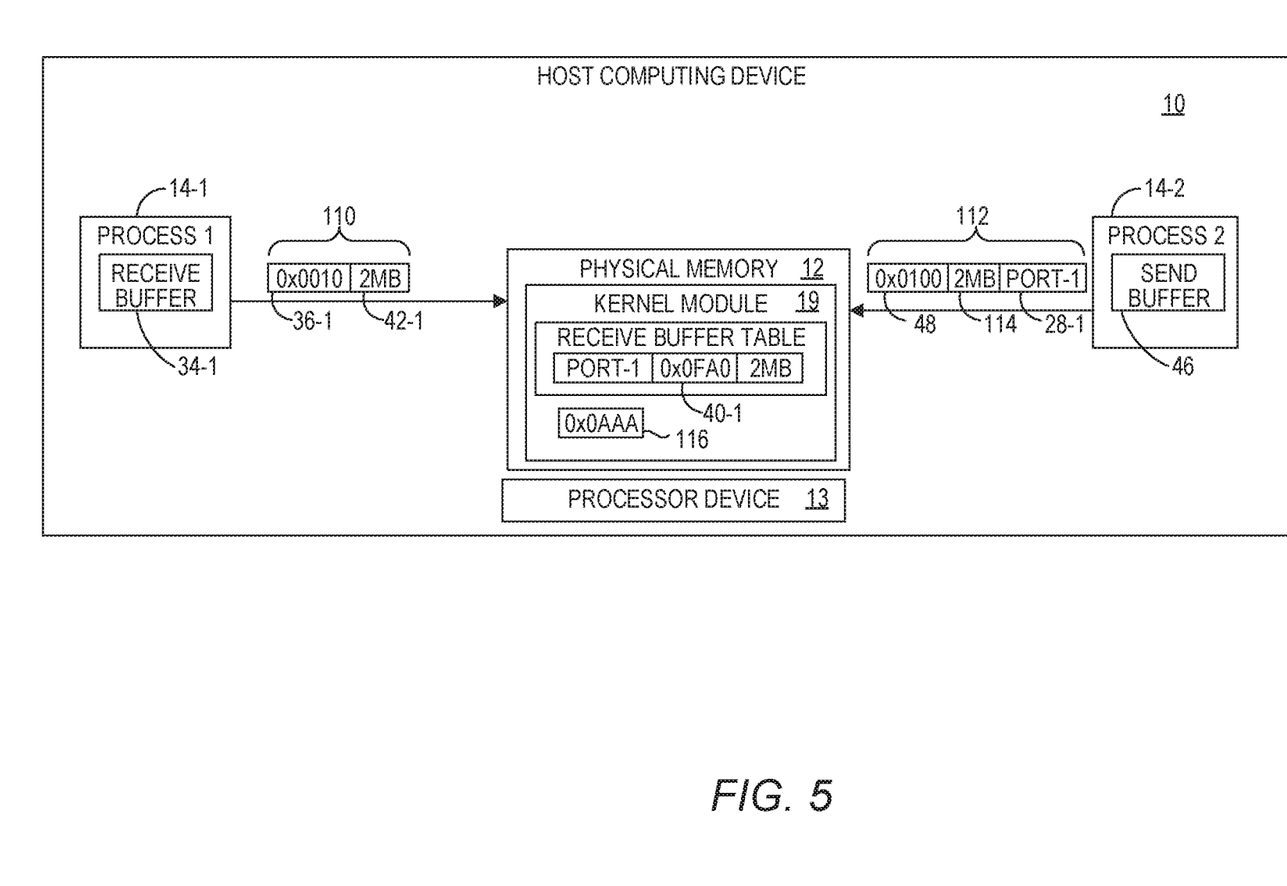
FIG. 5 is a block diagram of the host computing device illustrated in FIG. 1 according to another example.

FIG. 5 is a block diagram of the host computing device 10 illustrated in FIG. 1 according to another example. The host computing device 10 includes the physical memory 12 and the processor device 13. The processor device 13 is coupled to the physical memory 12 to receive, by the kernel module 19, from the process 14-1, buffer registration information 110 that identifies the virtual address 36-1 of the receive buffer 34-1 and the length 42-1 of the receive buffer 34-1. The kernel module 19 determines the physical memory address 40-1 that corresponds to the virtual address 36-1 of the receive buffer 34-1. The kernel module 19 receives from the process 14-2 a send request 112 to send data to the process 14-1. The send request 112 includes the virtual address 48 of the send buffer 46, a length of data 114, and the destination ID 28-1 that is associated with the receive buffer 34-1. The kernel module 19 determines a physical memory address 116 that corresponds to the virtual address 48 of the send buffer 46. The kernel module 19 transfers the data directly from the physical memory address 116 to the physical memory address 40-1.

Figure 6:
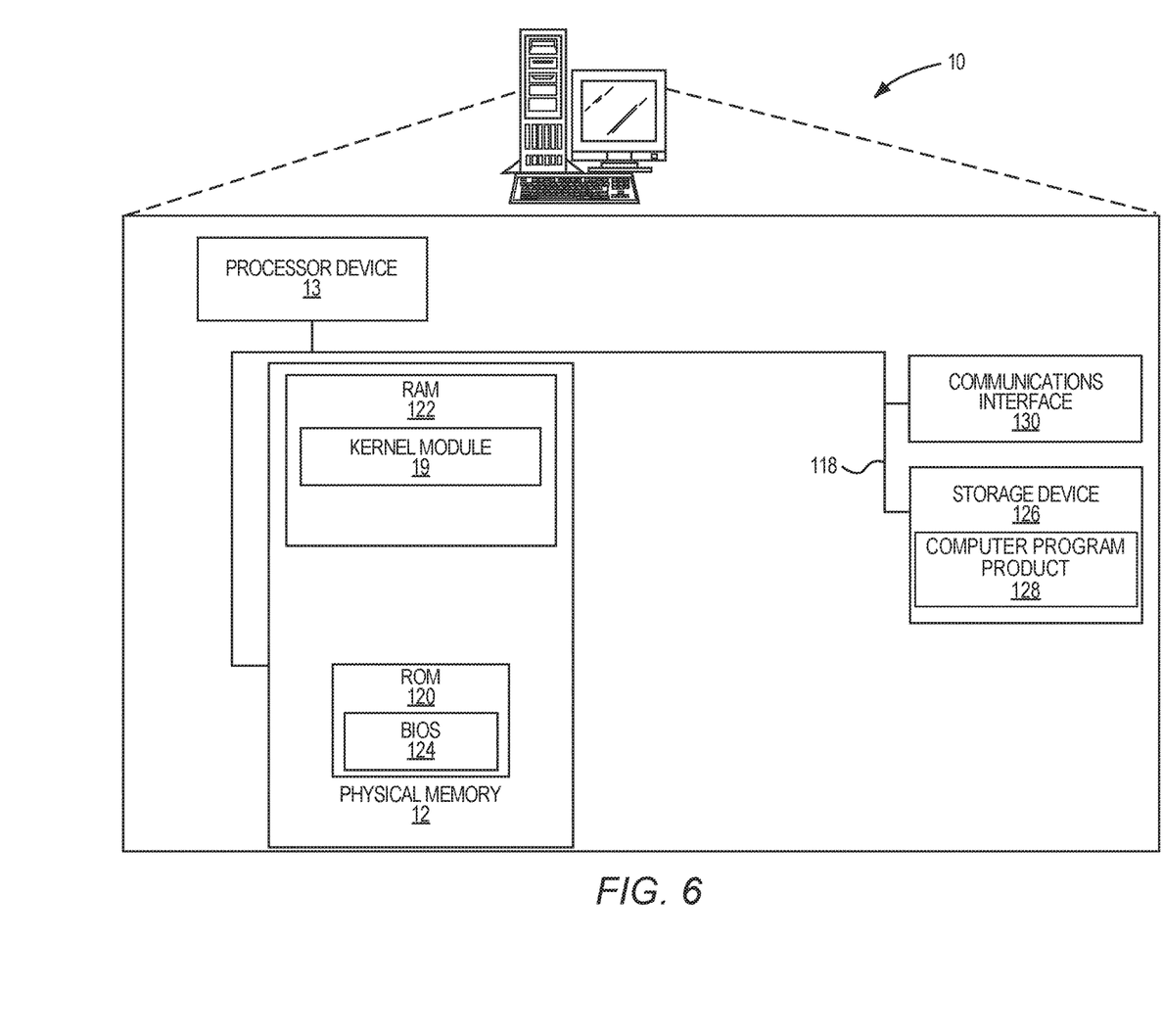
FIG. 6 is a block diagram of the host computing device illustrated in FIG. 1 suitable for implementing examples according to one example.

FIG. 6 is a block diagram of the host computing device 10 suitable for implementing examples according to one example. The host computing device 10 may comprise any computing or electronic device capable of including firmware, hardware, and/or executing software instructions to implement the functionality described herein, such as a computer server, a desktop computing device, a laptop computing device, or the like. The host computing device 10 includes the processor device 13, the physical memory 12, and a system bus 118. The system bus 118 provides an interface for system components including, but not limited to, the physical memory 12 and the processor device 13. The processor device 13 can be any commercially available or proprietary processor.

The system bus 118 may be any of several types of bus structures that may further interconnect to a memory bus (with or without a memory controller), a peripheral bus, and/or a local bus using any of a variety of commercially available bus architectures. The physical memory 12 may include non-volatile memory 120 (e.g., read-only memory (ROM), erasable programmable read-only memory (EPROM), electrically erasable programmable read-only memory (EEPROM), etc.), and volatile memory 122 (e.g., random-access memory (RAM)). A basic input/output system (BIOS) 124 may be stored in the non-volatile memory 120 and can include the basic routines that help to transfer information between elements within the host computing device 10. The volatile memory 122 may also include a high-speed RAM, such as static RAM, for caching data.

The host computing device 10 may further include or be coupled to a non-transitory computer-readable storage medium such as a storage device 126, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 126 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 126 and in the volatile memory 122, including the kernel modules 19, 19-1, which may implement the functionality described herein in whole or in part. All or a portion of the examples may be implemented as a computer program product 128 stored on a transitory or non-transitory computer-usable or computer-readable storage medium, such as the storage device 126, which includes complex programming instructions, such as complex computer-readable program code, to cause the processor device 13 to carry out the steps described herein. Thus, the computer-readable program code can comprise software instructions for implementing the functionality of the examples described herein when executed on the processor device 13. The processor device 13, in conjunction with the kernel modules 19, 19-1 in the volatile memory 122, may serve as a controller, or control system, for the host computing device 10 that is to implement the functionality described herein. The host computing device 10 may also include a communications interface 130 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:
1. A method for inter-process data transfer on a host computing device comprising:
    receiving, by a kernel module executing on the host computing device, from a first hypervisor process that provides a first emulated network card to a first virtual machine, buffer registration information that identifies a virtual address of a first emulated network card receive buffer and a length of the first emulated network card receive buffer;

determining, by the kernel module, a first physical memory address that corresponds to the virtual address of the first emulated network card receive buffer;

receiving, by the kernel module from a second hypervisor process that provides a second emulated network card to a second virtual machine, a send request to send data to the first hypervisor process, the send request including a virtual address of a second emulated network card send buffer, a length of the data, and a destination identifier that is associated with the first emulated network card receive buffer;

determining, by the kernel module, a second physical memory address that corresponds to the virtual address of the second emulated network card send buffer; and transferring, by the kernel module, the data directly from the second physical memory address to the first physical memory address.

2. The method of claim 1 wherein transferring, by the kernel module, the data directly from the second physical memory address to the first physical memory address further comprises transferring, by the kernel module, the data directly from the second physical memory address to the first physical memory address without making any intermediate copies of the data.

3. The method of claim 1 wherein the kernel module is configured to directly access a memory on the host computing device via a physical memory address, and the first hypervisor process and the second hypervisor process are configured to only access the memory on the host computing device via virtual addresses.

4. The method of claim 1 further comprising:
storing, by the kernel module, the first physical memory address, the length of the first emulated network card receive buffer, and the destination identifier that is associated with the first emulated network card receive buffer in a data structure; and wherein transferring the data directly from the second physical memory address to the first physical memory address further comprises:
accessing the data structure;
determining that the destination identifier received from the second hypervisor process matches the destination identifier associated in the data structure with the first emulated network card receive buffer; and
obtaining the first physical memory address from the data structure.

5. The method of claim 1 wherein the buffer registration information comprises a plurality of virtual addresses that correspond to a plurality of first emulated network card receive buffers, and a plurality of lengths that correspond to ones of the plurality of first emulated network card receive buffers, and further comprising:
for each virtual address of the plurality of virtual addresses:
determining a first physical memory address that corresponds to the virtual address; and
storing the first physical memory address, the length of the first emulated network card receive buffer, and the destination identifier that is associated with the first emulated network card receive buffer in a data structure.

6. The method of claim 1 further comprising notifying, by the kernel module, the first hypervisor process that the data has been transferred from the second physical memory address to the first physical memory address.

7. The method of claim 1 further comprising:
receiving, by the second hypervisor process, a transmission request from the second virtual machine to transmit a message via the second emulated network card, the transmission request including a second virtual machine guest address that points to the second emulated network card send buffer containing the message;

analyzing, by the second hypervisor process, the transmission request;

determining that the message is destined for the first emulated network card receive buffer; and communicating the send request to the kernel module, wherein the virtual address of the send buffer in the send request comprises a virtual address of the second hypervisor process that points to the second emulated network card send buffer, the length of the data in the send request comprises a length of the second emulated network card send buffer, and the destination identifier in the send request comprises the destination identifier associated with the first emulated network card receive buffer.

8. The method of claim 7 wherein the second hypervisor process communicates the send request to the kernel module in lieu of communicating the transmission request to a networking subsystem of the host computing device.

9. The method of claim 7 further comprising translating, by the second hypervisor process, the second virtual machine guest address to the virtual address of the second hypervisor process.

10. The method of claim 7 further comprising:
determining, by the second hypervisor process, a destination media access control address associated with the transmission request; and
determining that the destination media access control address is associated with the destination identifier that is associated with the first emulated network card receive buffer.

11. The method of claim 7 further comprising:
notifying the first hypervisor process, by the kernel module, that the message has been transferred from the second physical memory address to the first physical memory address; and
notifying, by the first hypervisor process, the first virtual machine that the message has arrived at the first emulated network card.

12. A host computing device, comprising:
a memory; and
a processor device coupled to the memory to:
receive, by a kernel module, from a first hypervisor process that provides a first emulated network card to a first virtual machine, buffer registration information that identifies a virtual address of a first emulated network card receive buffer and a length of the first emulated network card receive buffer;

determine, by the kernel module, a first physical memory address that corresponds to the virtual address of the first emulated network card receive buffer;

receive, by the kernel module from a second hypervisor process that provides a second emulated network card to a second virtual machine, a send request to send data to the first hypervisor process, the send request including a virtual address of a second emulated network card send buffer, a length of the data, and a destination identifier that is associated with the first emulated network card receive buffer;

determine, by the kernel module, a second physical memory address that corresponds to the virtual address of the second emulated network card send buffer; and transfer, by the kernel module, the data directly from the second physical memory address to the first physical memory address.

13. The host computing device of claim 12 wherein the kernel module is configured to directly access the memory on the host computing device via a physical memory address, and the first hypervisor process and the second hypervisor process are configured to only access the memory on the host computing device via virtual addresses.

14. The host computing device of claim 12 wherein the processor device is further to:

store, by the kernel module, the first physical memory address, the length of the first emulated network card receive buffer, and the destination identifier that is associated in the data structure with the first emulated network card receive buffer in a data structure; and wherein to transfer the data directly from the second physical memory address to the first physical memory address the processor device is further to:

access the data structure;

determine that the destination identifier received from the second hypervisor process matches the destination identifier associated in the data structure with the first emulated network card receive buffer; and obtain the first physical memory address from the data structure.

15. The host computing device of claim 12 wherein the processor device is further to:

receive, by the second hypervisor process, a transmission request from the second virtual machine to transmit a message via the second emulated network card, the transmission request including a second virtual machine guest address that points to the second emulated network card send buffer containing the message;

analyze, by the second hypervisor process, the transmission request;

determine that the message is destined for the first emulated network card receive buffer; and communicate the send request to the kernel module, wherein the virtual address of the send buffer in the send request comprises a virtual address of the second hypervisor process that points to the second emulated network card send buffer, the length of the data in the send request comprises a length of the second emulated network card send buffer, and the destination identifier in the send request comprises the destination identifier associated with the first emulated network card receive buffer.

16. A computer program product stored on a non-transitory computer-readable storage medium and including instructions to cause a processor device to:

receive, by a kernel module, from a first hypervisor process that provides a first emulated network card to a first virtual machine, buffer registration information that identifies a virtual address of a first emulated network card receive buffer and a length of the first emulated network card receive buffer;

determine, by the kernel module, a first physical memory address that corresponds to the virtual address of the first emulated network card receive buffer;

receive, by the kernel module from a second hypervisor process that provides a second emulated network card to a second virtual machine, a send request to send data to the first hypervisor process, the send request including a virtual address of a second emulated network card send buffer, a length of the data, and a destination identifier that is associated with the first emulated network card receive buffer;

determine, by the kernel module, a second physical memory address that corresponds to the virtual address of the second emulated network card send buffer; and transfer, by the kernel module, the data directly from the second physical memory address to the first physical memory address.

17. The computer program product of claim 16 wherein the instructions further cause the processor device to:

store, by the kernel module, the first physical memory address, the length of the first emulated network card receive buffer, and the destination identifier that is associated with the first emulated network card receive buffer in a data structure; and wherein to transfer the data directly from the second physical memory address to the first physical memory address the instructions further cause the processor device to:

access the data structure;

determine that the destination identifier received from the second hypervisor process matches the destination identifier associated in the data structure with the first emulated network card receive buffer; and obtain the first physical memory address from the data structure.

\* \* \* \* \*